March 27, 1934.  C. W. SINCLAIR  1,952,338
METHOD OF FORMING HUB SHELLS
Filed Aug. 25, 1930  2 Sheets-Sheet 1
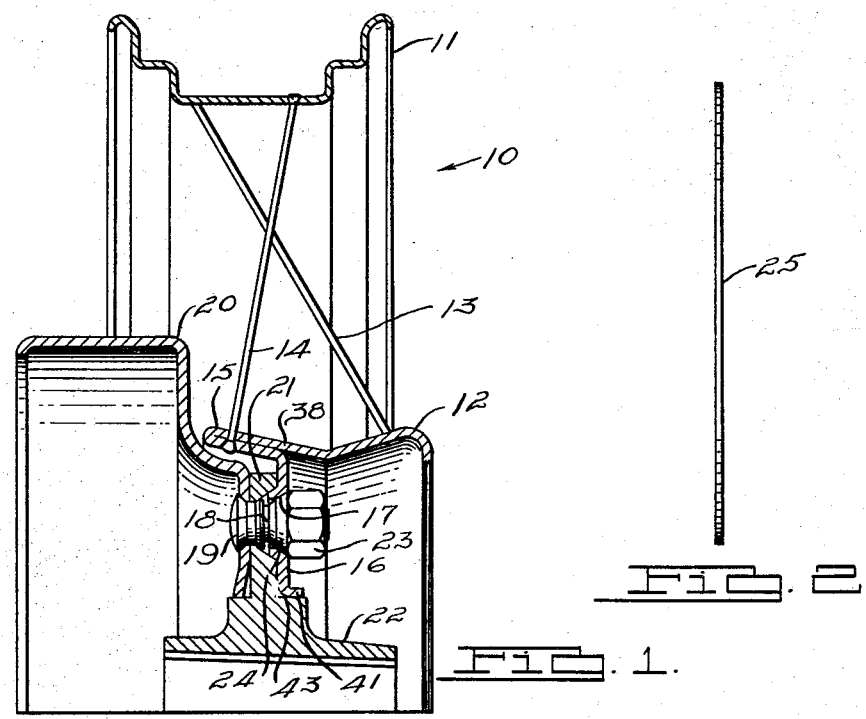
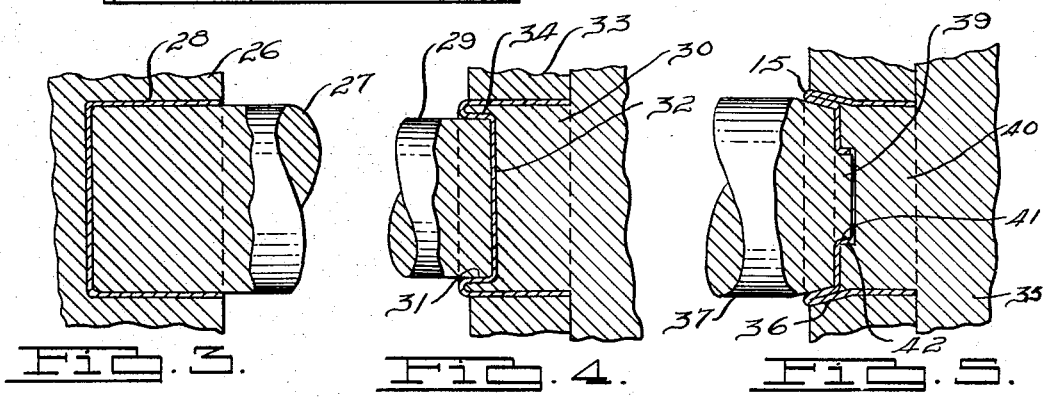
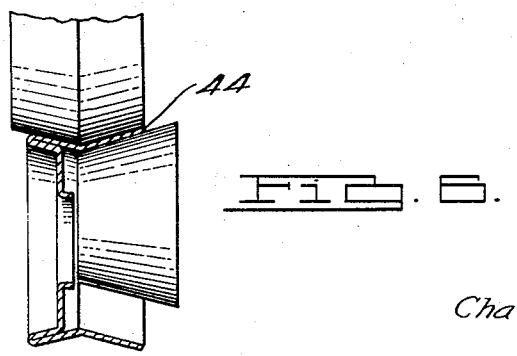
INVENTOR
Charles W. Sinclair.
BY Whittemore Hulbuh
Whittemore & Bellough
ATTORNEY March 27, 1934.     C. W. SINCLAIR     1,952,338
METHOD OF FORMING HUB SHELLS
Filed Aug. 25, 1930     2 Sheets-Sheet 2

INVENTOR
Charles W. Sinclair.
BY Whittemore Hulbert
Whittemore & Belknap
ATTORNEY Patented Mar. 27, 1934

1,952,338

UNITED STATES PATENT OFFICE 1,952,338

METHOD OF FORMING HUB SHELLS

Charles W. Sinclair, Detroit, Mich., assignor to Kelsey-Hayes Wheel Corporation, Detroit, Mich., a corporation of New York Application August 25, 1930, Serial No. 477,724

5 Claims. (Cl. 29—159.3)

This invention relates to vehicle wheel hub shells and has particular reference to a method of manufacturing hub shells.

One of the principal objects of this invention is to provide an improved method of fashioning vehicle wheel hub shells which not only reduces the cost of manufacture and the number of parts to a minimum, but in addition facilitates production and provides a strong and durable shell.

Another advantageous feature of this invention which contributes materially to the reduction in the number of parts and the cost of manufacture resides in the provision of a hub shell having radially projecting attaching portions extending inwardly therefrom and formed integral therewith.

The foregoing, as well as other objects of the invention, will be made more apparent as this description proceeds, especially when considered in connection with the accompanying drawings, wherein:

Figure 1 is a central sectional view through a vehicle wire wheel equipped with a hub shell constructed in accordance with this invention.

Figure 2 is a side elevational view of a strip of metal from which the hub shell shown in Figure 1 is formed.

Figures 3, 4, 5 and 6 are sectional views showing the various steps in the method of fashioning the hub shell illustrated in Figure 1.

Figure 7:
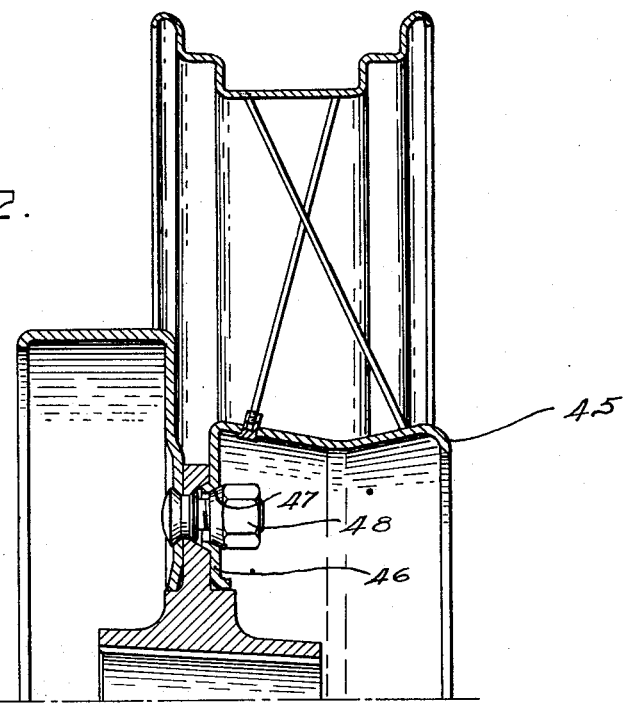
Figure 7 is a view similar to Figure 1 showing a slightly modified form of construction.

Referring now to the drawings and with special reference to Figure 1, it will be noted that I have illustrated in this figure a vehicle wire wheel 10 comprising a rim member 11 of any suitable design and a hub shell 12 arranged concentrically within the rim 11 and connected thereto by means of the front and rear spokes 13 and 14, respectively. The inner ends of the spokes are preferably riveted to the inner surface of the shell 12 adjacent the opposite ends thereof, while the outer ends of the spokes are riveted to the base of the rim in any suitable manner. In order to secure the wheel to a vehicle, the shell 12 is provided with a return-bent portion 15 at the rear end thereof terminating in a radially inwardly extending flange 16 having a series of circumferentially spaced openings 17 therein for receiving the threaded shank portions 18 of the fastening elements 19. The fastening elements 19 are permanently carried by the brake drum 20 and fixed flange 21 extending radially from the inner hub member 22 and serves to rigidly and permanently clamp the brake drum to the rear face of the fixed flange. Suitable nuts 23 are threadedly mounted upon the forward ends of the fastening elements 19 and are provided with conical surfaces 24 arranged to engage correspondingly shaped surfaces surrounding the openings 17 in the flange 16. Thus, from the foregoing it will be observed that the fastener elements 19, in addition to permanently securing the brake drum to the fixed inner hub flange 21, also functions to demountably secure the hub shell and accordingly the wheel to the vehicle. It will further be apparent from the above description considered in connection with Figure 1, that the hub shell is of one piece construction and that the attaching flange 16 and fastening elements aforesaid are thoroughly concealed thereby.

While numerous methods may be devised for forming the hub shell 12 hereinbefore described, nevertheless, the following method of fashioning the hub shell has been selected for the purpose of illustration since it is extremely simple and economical. The apparatus shown herein for the purpose of carrying out the various steps in the method of manufacturing the hub shell is for the purpose of illustration only and forms no part of the present invention.

The hub shell 12 is preferably fashioned from a circular piece of stock 25 by subjecting the central portion of the stock to pressure in one direction and the peripheral portion thereof to pressure in another direction to form a cup-shaped member. As shown in Figure 3, the foregoing may be accomplished by introducing the blank to a relatively movable die and punch 26 and 27, respectively. The die 26 being formed with a cup-shaped recess 28 therein adapted to cooperate with the punch 27 upon relative movement of these parts to form the cup-shaped member specified above. Upon completion of the drawing operation just described, the central portion 32 of the base of the cup-shaped member is subjected to an axial pressure in a direction toward the opposite end of the member to position the said portion intermediate the ends of the cup-shaped member as shown in Figure 4. The above operation may be accomplished by means of a plunger 29 of predetermined diameter and a die 30 having a cup-shaped opening 31 therein fashioned to cooperate with the plunger 29 to displace the central portion 32 to a position intermediate the ends of the cup-shaped member as previously set forth. Any suitable means as indicated generally by the reference character 33 may be provided for preventing deformation of the annular side walls of the cup-shaped member during the latter operation.

In displacing the base portion 32 of the cup-shaped member axially inwardly, a depression in the cup-shaped member is formed having the annular side walls 34 thereof spaced inwardly from the annular side walls of the cup-shaped member. After the cup-shaped member has been fashioned to the contour illustrated in Figure 4, the annular side walls of the same and adjacent walls 34 of the depression in the base thereof are brought together, as shown in Figure 5, to form the return-bent portion 15 of the hub shell. The foregoing may be accomplished by inserting the cup-shaped member, illustrated in Figure 4, within a die 35 having an outwardly flared upper end portion 36 adapted to cooperate with a correspondingly tapered plunger 37 to form the return-bent portion aforesaid and to flare the same outwardly as indicated by the reference character 38 in Figure 1. If desired, the plunger 37 may be provided with an axially extending projection 39 adapted to cooperate with a die 40 to punch the central opening 41 in the base of the cup-shaped member so as to form the radially inwardly extending flange 16 of the shell and to provide for sleeving the latter over the inner hub 22. In this connection it is to be noted that during the punching operation, the inner portions of the flange 16 surrounding the opening 41 are bent forwardly as at 42 to provide for positioning the hub shell upon the annular shoulder 43 of the inner hub 22.

After the rear portions of the shell have been fashioned, as specified above, the forward end of the same is flared outwardly as at 44 preferably by the rolling operation illustrated in Figure 6. The forward end of the flared portion 44 is then bent inwardly by a swaging or other suitable operation to provide for attaching the usual hub cap to the shell. The openings 17 in the flange 16 for receiving the fastener elements may be punched and countersunk at any convenient time during the process of fashioning the shell and by any suitable mechanism. Thus, from the foregoing it will be observed that I have provided a method of fashioning a single piece of metal to form a hub shell having concealed means for attaching the same to the inner hub, thereby materially minimizing the number of parts and reducing the cost of manufacture and weight of the hub shell. In this connection it is to be noted that the weight of the shell may further be reduced by cutting away portions of the flange 16 intermediate the openings 17 to form attaching lugs and accordingly the invention contemplates such an arrangement. It will further be seen that a hub shell fashioned in accordance with the above description lends itself readily for use in connection with a riveted spoke wheel since the inner ends of the front spokes may be conveniently reached by the riveting mechanism from the opening in the front of the shell, while the inner ends of the rear spokes may be conveniently riveted to the inner surface of the return-bent portion which projects rearwardly from the attaching flange 16.

The vehicle wheel illustrated in Figure 7 is substantially the same as the one previously described with the exception that the inner ends of the rear spokes are not riveted to the hub shell and the shell is of a different contour. The shell 45, illustrated in Figure 7, differs from the shell 12, hereinbefore set forth, in that the rear end portion thereof is not return-bent, but on the other hand terminates in an annular flange 46 having openings 47 therein similar to the openings 17 for receiving the fastener elements 48 which are identical in construction and purpose as the fastening elements 19 specified above.

Figure 8:
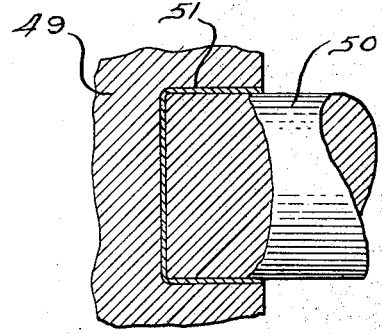
Figures 8, 9, 10 and 11 are sectional views showing various steps in the method of fashioning the hub shell illustrated in Figure 7.
Figure 9:
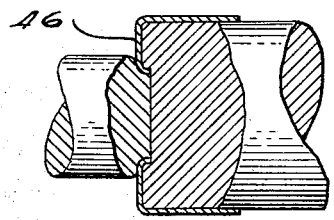
Figure 10:
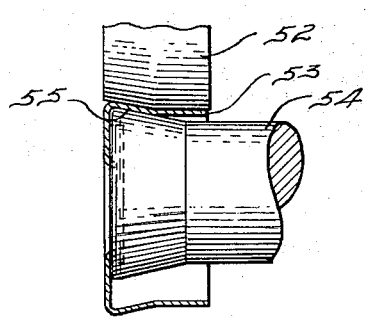
Figure 11:
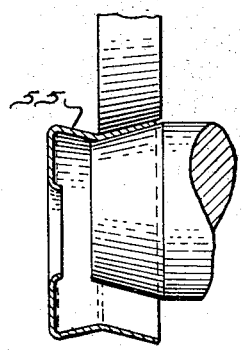

As will be observed from Figure 8, the shell 45 may also be fashioned by a drawing operation from a circular piece of metal by subjecting the metal blank to a die 49 and a plunger 50 arranged to cooperate with each other to form the blank into substantially a cup-shaped member 51. The central part of the base portion of the cup-shaped member 51 is then countersunk and punched as shown in Figure 9, to form the radially inwardly extending flange 46. The article thus fashioned may be introduced to a rolling machine comprising an outer roll 52 having a peripheral surface corresponding to the exterior surface of the annular wall 53 of the member and having an inner roll 54 cooperating with the outer roll 52 to fashion the rearwardly and outwardly flared portion 55 of the shell 45. The forward end of the shell 45 may then be fashioned in the same manner as set forth in the first-described form of the invention if desired. As in the process previously described, the openings 47 through the flange 46 may be fashioned at any convenient time during the process and by any suitable mechanism not shown.

The hub 45 is extremely simple and economical to manufacture and is of one piece construction. This hub, however, does not adapt itself so readily for use in connection with the riveted type wheel owing to the inaccessibility of the inner ends of the rear spokes.

While two embodiments of the invention have been illustrated and described herein somewhat in detail, it should be understood that various changes in the method of fashioning the hub shells, specified above, may be resorted to without materially altering the finished product. For example, both the hub shells 12 and 45 may be fashioned by a rolling operation rather than a drawing operation and moreover certain of the steps in both the methods of manufacture, illustrated above, may be re-arranged without departing from the spirit and scope of this invention and accordingly reservation is made to make such changes as may come within the purview of the accompanying claims.

What I claim as my invention is:

1. Those steps in the method of forming vehicle wheel hub shells which consists in fashioning a metal blank to form a substantially cup-shaped member, displacing the central portions of the base of the cup-shaped member axially to position the same within the boundary of the side walls of the member, forming an opening in the portion displaced to form a radially inwardly extending flange, fashioning said flange to form attaching portions, and fashioning the side walls of the member to the contour of the hub shell.

2. Those steps in the method of forming vehicle wheel hub shells which consist in fashioning a blank to form a member with an annular portion and with a flange extending radially inwardly from one end of the annular portion, bending the latter end of the annular portion inwardly upon itself to locate the inner end of said flange intermediate the ends of the annular portion, and fashioning said flange to form attaching portions.

3. Those steps in the method of forming vehicle wheel hub shells which consist in fashioning a blank to form a member with an annular portion and with a flange extending radially inwardly from one end of the annular portion, displacing the inner end of the flange axially toward the opposite end of the annular portion to locate the flange intermediate the ends of the annular portion, crimping the portion connecting the flange with the annular portion against the inner surface of the latter and fashioning the flange to form attaching portions.

4. Those steps in the method of forming vehicle wheel hub shells which consist in fashioning a blank to form a member with an annular portion and with a flange extending radially inwardly from one end of the annular portion, displacing the inner end of the flange axially toward the opposite end of the annular portion to locate the flange intermediate the ends of the annular portion, rolling the annular portion to the desired contour of the hub shell and simultaneously crimping the portion connecting the radially inwardly extending flange with the end aforesaid of the annular portion against the inner surface thereof, and fashioning the flange to form attaching portions.

5. Those steps in the method of forming vehicle wheel hub shells which consist in fashioning a metal blank to form a member having an annular portion and having a portion extending inwardly from one end of the annular portion, displacing the inwardly extending portion axially of the annular portion toward the opposite end thereof, fashioning the inwardly extending portion to provide for the passage therethrough of a fastener element, and bending the inner end of said inwardly extending portion axially of the annular portion to form a shoulder for positioning the shell relative to a hub.

CHARLES W. SINCLAIR.